US010634323B2

(12) United States Patent
Stevenson

(10) Patent No.: US 10,634,323 B2
(45) Date of Patent: Apr. 28, 2020

(54) TOOL HOLDER CLAMP FOR SUCTION HOSE

(71) Applicant: Christopher Stevenson, Canton, NY (US)

(72) Inventor: Christopher Stevenson, Canton, NY (US)

(*) Notice: Subject to any disclaimer, the term of this patent is extended or adjusted under 35 U.S.C. 154(b) by 82 days.

(21) Appl. No.: 16/023,730

(22) Filed: Jun. 29, 2018

(65) Prior Publication Data

US 2020/0003401 A1 Jan. 2, 2020

(51) Int. Cl.

| | |
|---|---|
| ***F21V 21/088*** | (2006.01) |
| ***A47L 9/30*** | (2006.01) |
| *F16B 7/14* | (2006.01) |
| *F16B 2/06* | (2006.01) |

(52) U.S. Cl.

CPC ............ *F21V 21/0885* (2013.01); *A47L 9/30* (2013.01); *F16B 2/065* (2013.01); *F16B 7/1418* (2013.01)

(58) Field of Classification Search

CPC ........ F21V 21/0885; A47L 9/30; F16B 2/065; F16B 7/1418

See application file for complete search history.

(56) References Cited

U.S. PATENT DOCUMENTS

| | | | | |
|---|---|---|---|---|
| 3,252,192 | A * | 5/1966 | Smith | F16L 1/10 269/117 |
| 4,150,848 | A * | 4/1979 | Dyrup | F16L 33/23 285/238 |
| 5,209,524 | A * | 5/1993 | Corwon | F16L 23/032 285/114 |
| 5,641,185 | A * | 6/1997 | Harth | F01N 13/1805 24/284 |
| 5,795,053 | A | 8/1998 | Pierce | |
| 5,873,647 | A | 2/1999 | Kurtz et al. | |
| 6,079,753 | A * | 6/2000 | Erwin | F01N 13/1805 285/328 |
| 6,116,747 | A | 9/2000 | Grawemeyer et al. | |
| 6,264,251 | B1 * | 7/2001 | Kunsman | F16L 23/032 285/405 |
| 6,379,020 | B1 | 4/2002 | Lewis et al. | |
| 7,006,615 | B2 | 2/2006 | Diggle, III et al. | |
| 7,300,172 | B1 | 11/2007 | Lefler | |
| 7,384,076 | B2 * | 6/2008 | Bradley | F16L 21/08 285/104 |
| 9,163,760 | B2 * | 10/2015 | Lundstrom | F16L 23/024 |

* cited by examiner

*Primary Examiner* — Dung Van Nguyen

(74) *Attorney, Agent, or Firm* — Bernhard P. Molldrem, Jr.

(57) ABSTRACT

A tool holder clamp fits over the suction hose or intake nozzle of a vacuum pumper truck. The clamp takes the form of two or more C-shaped sections that can bolt together over the hose, with each C-shaped section having one or more through bores serving as sockets for holding a tool such as a flashlight or the head or nozzle of a jet hose. The sockets have associated slots to permit the socket to be snugged down against the tool.

14 Claims, 5 Drawing Sheets

14
14
10
14
16
16
12

126
126
120
120
134
134

130
130

TOOL HOLDER CLAMP FOR SUCTION HOSE

BACKGROUND OF THE INVENTION

The invention is directed to a tool holder that can be clamped onto a vacuum hose or suction hose or onto the intake nozzle that is placed on the end of the hose and is inserted into a septic tank or other reservoir of liquid waste so that the liquid waste can be sucked up, typically into a vacuum tank on a pumper truck of the type that are used throughout the septic service industry.

Typically, the truck has a vacuum tank with a capacity of a few thousand gallons and has a vacuum pump capable of evacuating the tank to about minus 18 to minus 21 inches of mercury (about minus 10 psig). The hose is inserted into the septic tank for the purpose of sucking the waste up through the hose into the tank on the truck. It typically take about an hour to remove the liquid from a typical septic tank this way. For deeper, vertical septic tanks hardly any light enters the septic tank and it can be very difficult for the operator to check visually on the level in the tank, or to navigate the nozzle of the hose to the best position. Moreover, it is often needed to use a jet spray or fetter to knock off obstructions that may block the sewage from being picked up by the hose.

Accordingly, there has been a need to provide a simple system to improve the lighting within the septic system and elsewhere when attachment is to be fitted onto a vacuum hose of this type or on a hose or fixture of that diameter. It is another object to provide an intake nozzle for the suction hose that eases the flow of the liquid waste through the suction hose into the storage tank on the vacuum pumper truck, which reduces the time to pump out the customer's septic tank, and which reduces the problems of blockage and spillage.

According to an important aspect of the present invention, an intake nozzle is fitted onto the distal end of the suction hose, and incorporates a mechanism that mixes air into the liquid at the intake point. This action also floats the nozzle at or near the top surface of the liquid waste which makes it easier for the employee to manipulate the vacuum hose. This tool has been found to decrease the loading time from the typical one hour to about 24 minutes.

In a practical embodiment, the vacuum intake nozzle of this invention has a generally vertical tubular body, In operation, the hose is lowered into the septic tank, and the nozzle penetrates below the top surface. The vacuum pump in the pumper truck is turned on, which evacuates the tank, and eventually creates a suction inside the hose. This suction causes the liquid waste to start to move up into the nozzle and up the vacuum hose towards the pumper truck. The shape and dimensions of the nozzle can vary, but most generally stated, the nozzle has an elongated tubular body or housing, which is usually oriented vertically, and with an upper end adapted to secure to a distal end of the suction hose.

In order to illuminate the inside of the septic tank in the vicinity of the end of the hose or the nozzle, the operator typically will shine a flashlight into the top opening of the tank. This requires the operator to use one hand for the flashlight and one for controlling the hose, or else it is necessary to have a helper hold the light and aim it into the tank. When the tank is partly evacuate, the surface of the material can be a long ways below the top opening of the septic tank, so that the flashlight no longer provides well-aimed illumination of adequate strength.

It is often necessary to us a jet sprayer or jetter to direct a jet of water onto solid matter that may be obstructing the flow of the waste water, or may be clinging to the sides of the tank. It would be convenient to attach the jetter hose to the hose or to the hose nozzle so that the operator can use both hands to control the vacuum hose. However no adequate hose clamp has been available to attach the jetter hose onto the vacuum hose or its intake nozzle.

OBJECTS AND SUMMARY OF THE INVENTION

It is an object to provide a convenient mechanism for mounting one or more lamps or lights onto the distal end of a vacuum hose or its intake nozzle so as to direct a suitable amount of illumination in the same direction as the intake nozzle.

It is another object to provide such a mechanism as a hose clamp holder of a design that can be easily clamped, removably, onto the hose or nozzle using standard tools, and which can hold the one or more lighting devices snugly and firmly.

A further object is to have the hose clamp holder in the form of curved members that bolt together over the hose or nozzle and attach firmly without damage to the hose or nozzle.

A still further object is to provide the clamp holder in a form that can be used for holding any of a variety of tools that have a generally cylindrical section, e.g., the nozzle of a fetter hose.

According to an aspect of this invention, a hose clamp holder is provided for mounting one or more generally tubular objects onto a hose of a generally cylindrical section and of predetermined diameter. The hose clamp holder is comprised of a pair of generally C-shaped halves, each half having a half-round inner curved surface generally of a predetermined radius to match the associated hose or nozzle. Each clamp half has one or more round apertures that each extend axially through the respective C-shaped half, with the aperture serving as a socket for the flashlight of other tool shaped as a cylinder with similar profile, and each clamp half has a pair of end portions adapted to receive a fastener (e.g., a threaded bolt) to join that end portion with a corresponding end portion of the other C-shaped member. Favorably the C-shaped halves are provided with a pair of said round apertures spaced apart at substantially ninety degrees of arc. The round apertures can each have an associated cut-out extending generally in a circumferential direction from said round aperture and defining a deflectable tongue at a radially outer portion of the C-shaped half, said tongue having a free end spaced from said round aperture. The apertures or sockets may have a textured grip surface. The terms "half" and "halves" as used here can comprehend clamp holders formed with three or more C-shaped members.

Favorably, the C-shaped member has an arcuate portion disposed along each cut-out opposite the associated tongue and radially inward of it on the C-shaped member. The tongues can each have a bore extending radially through it and having a portion extending into the associated one of said arcuate portions. The latter portion can be threaded to accept a bolt or similar threaded fastener, so that the aperture or socket can be squeezed to hold the tool snugly in place.

Each C-shaped half is most favorably formed of a synthetic resin of suitable stiffness and resiliency such that each said tongue is adapted to be deflected radially for clamping one of said tubular objects within the associated round aperture. Each such C-shaped half may have a radial shoulder formed at each end thereof with a bore configured for accepting a fastener passing through it, and through the bore of the corresponding shoulder of a mating C-shaped member.

In a favorable embodiment, the predetermined radius of said half-round inner surface is in the range of substantially 1½ to 2 inches; the C-shaped member has an axial thickness of substantially 1 inch to 1½ inches, and has a radial thickness of substantially 1½ inches to 2 inches, with the sockets or round apertures having a diameter of substantially 1¼ inches.

Together with the vacuum hose and/or intake nozzle, a useful combination is formed with the hose clamp holder to permit mounting one or more generally tubular objects onto the hose (which has a generally cylindrical section and having a predetermined diameter). As aforesaid, the hose clamp holder comprises a pair of generally C-shaped halves, each half having a half-round inner curved surface having generally said predetermined radius; with each half having one or more round apertures that each extend axially through the respective C-shaped half, and with each C-shaped half having a pair of end portions adapted to receive a fastener to join the end portion with a corresponding end portion of the other C-shaped member. Then, one or more than one tool in the form of a tubular member can be fitted into a round apertures and directed in an axial direction aligned with the hose. The tool may take the form of a flashlight or lamp having a casing that is generally cylindrical and of a diameter to fit snugly into the round aperture, or may comprise a jet spray tool for configured for spraying a jet of water in the axial direction and having a nozzle portion of a diameter to fit snugly into one of the apertures.

The main construction and principles of the invention can be understood from the ensuing detailed description of one or more preferred embodiments, to be considered in connection with the accompanying Drawing.

DETAILED DESCRIPTION OF A PREFERRED EMBODIMENT

Figure 1:
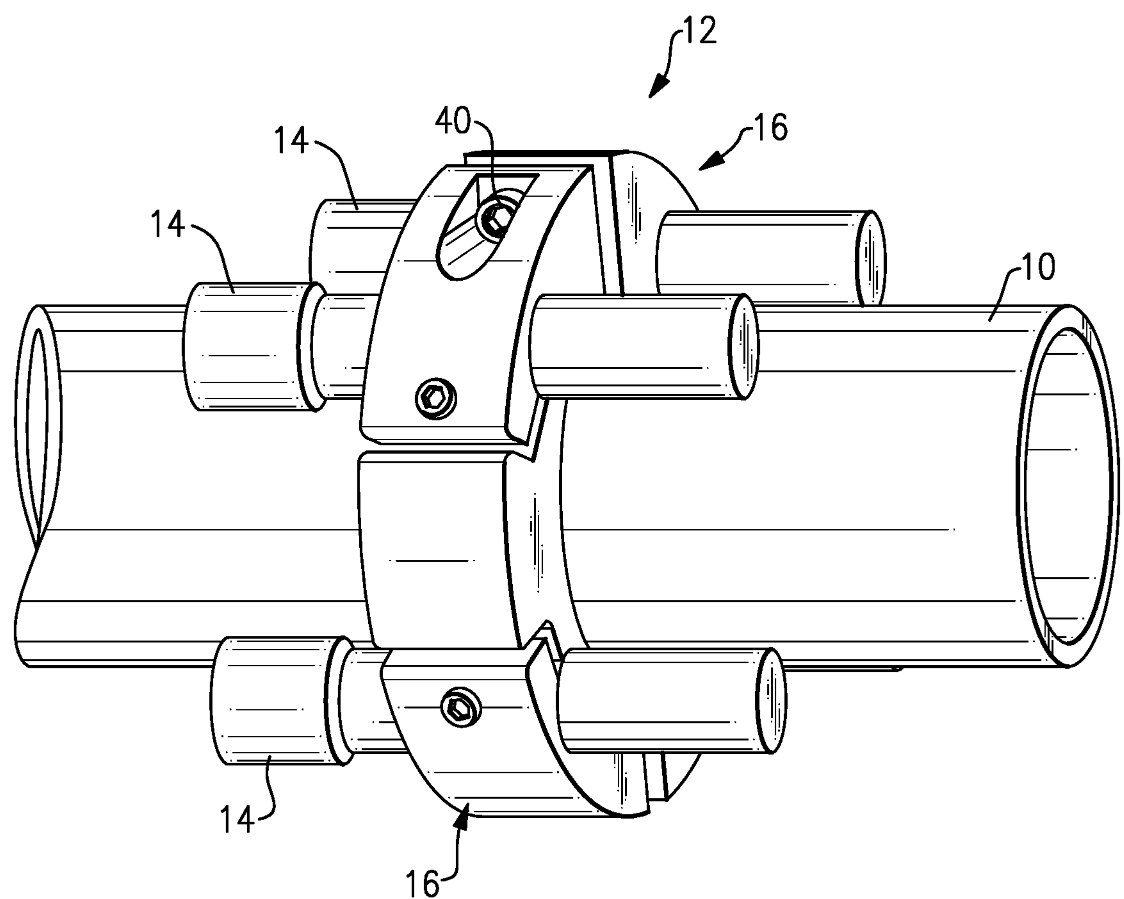
FIG. 1 is a perspective view showing a portion of suction hose on which is mounted a holder clamp according to one embodiment of this invention.
Figure 2:
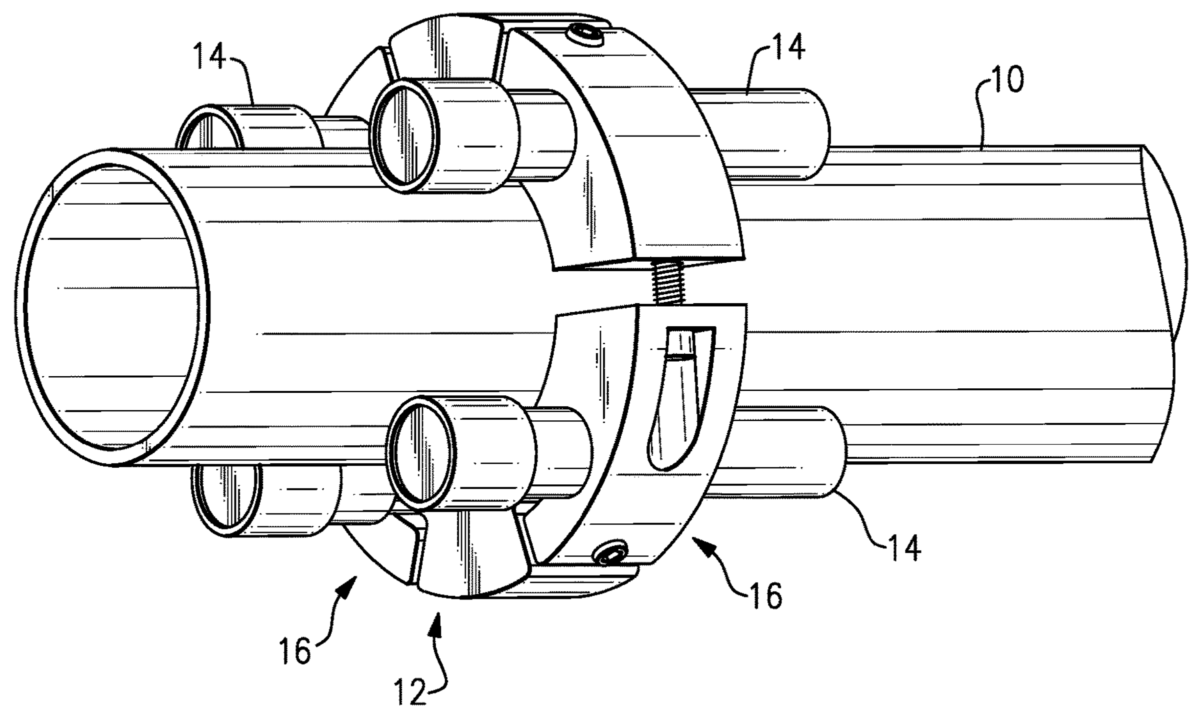
FIG. 2 is second perspective view thereof.
Figure 3D:
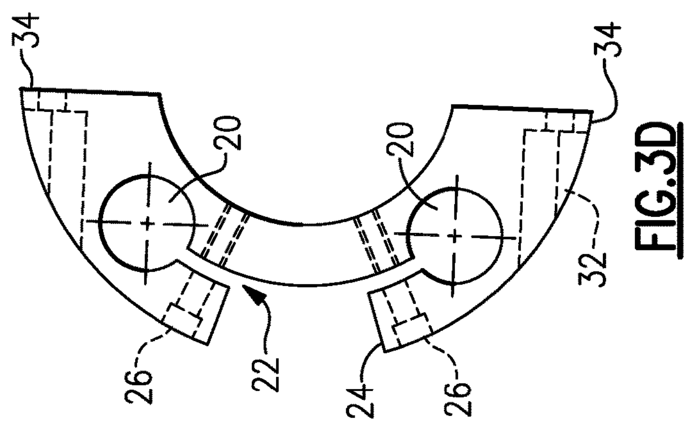
FIGS. 3A to 3D are a perspective view, cross section, radial view and axial view, respectively, of one of the C-shaped members of an embodiment of this invention.
Figure 3C:
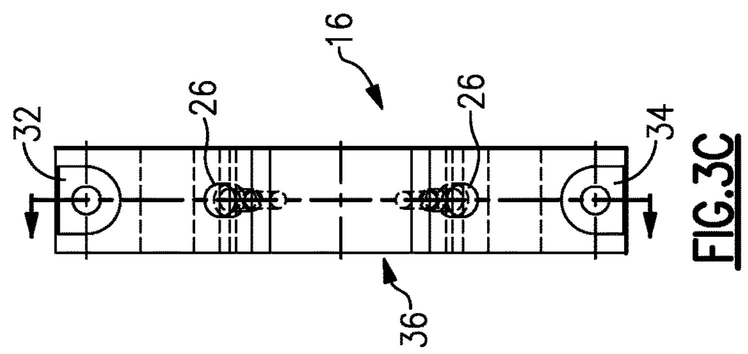
Figure 3A:
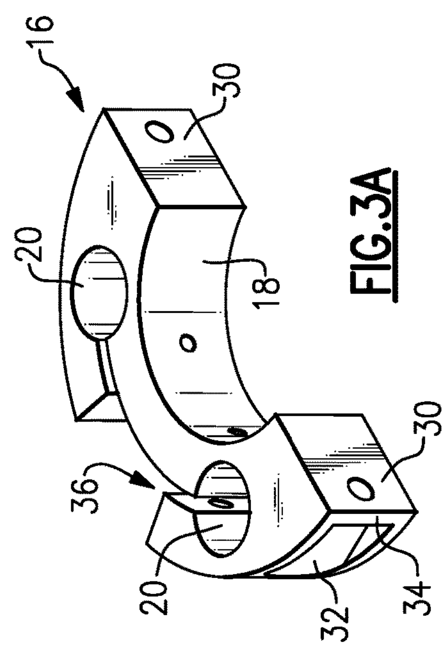
Figure 3B:
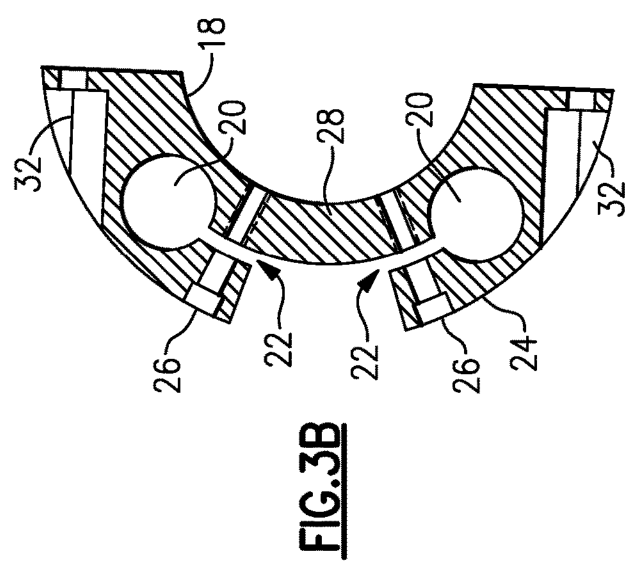
Figures 4A, 4B, 4C, 4D:
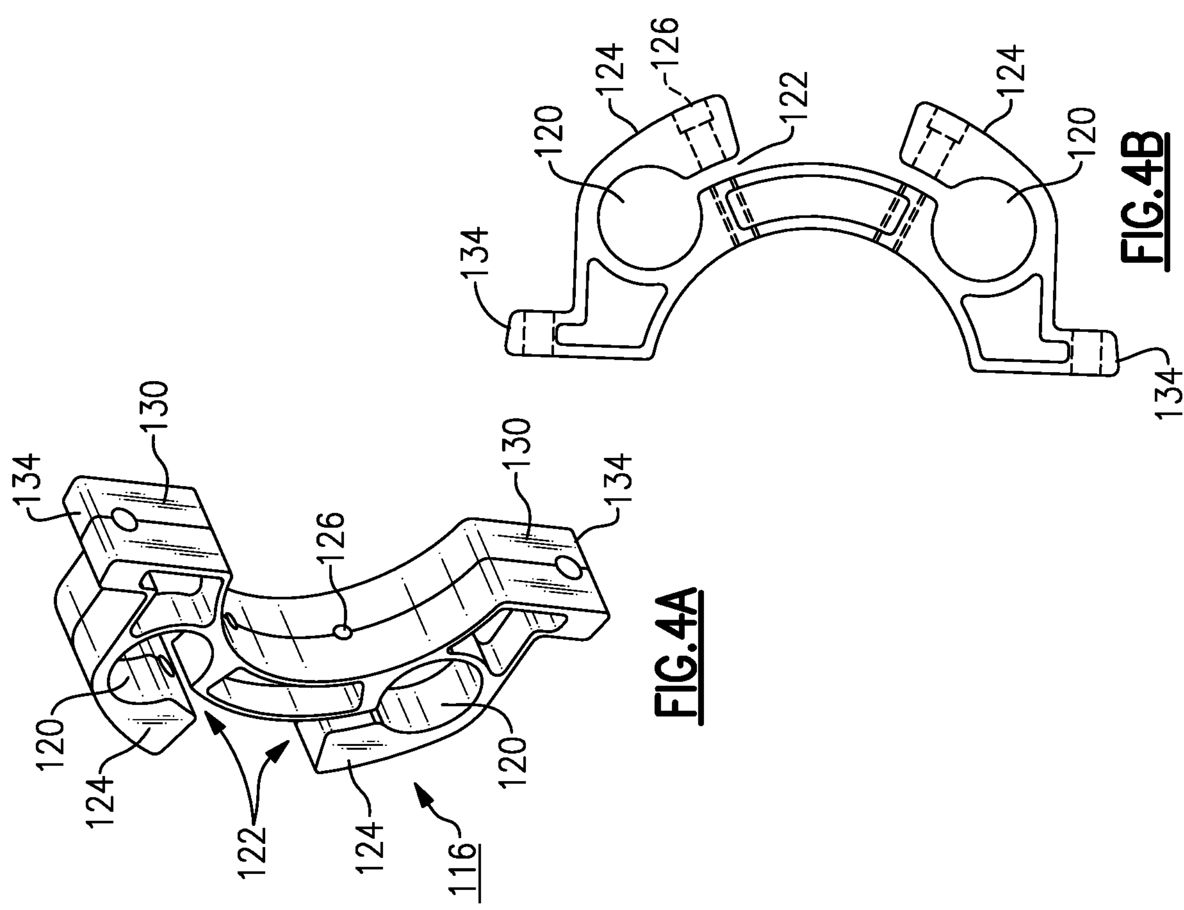
FIG. 4A to 4D are a perspective view, axial view, radial view and cross section, respectively, of one of the C-shaped members of an alternative embodiment of this invention.

With reference to the Drawing Figures, FIGS. 1 and 2 illustrate a typical implementation of the suction hose clamp holder according to the principles of this invention. In a sanitary waste tank situation, a suction hose or vacuum hose 10 would extend from pumper truck (not shown here) and into a customer's septic tank so that the liquid waste in the septic tank can be pumped through the suction hose 10 into the truck's vacuum tank. While the septic tank may be partly above ground, it is understood that typically the septic tank extends down a significant distance below the surface. In order for the operator to see into the septic tank and guide the intake nozzle of the suction hose, it is useful to employ a torch or flashlight that is aimed in the axial direction of the intake nozzle. At the current time, the operator has to hold the torch or flashlight in one hand and guide the suction hose with the other hand, or else the operator needs to enlist a helper to shine the light into the septic tank through the opening in the top of the septic tank. Neither technique has been particularly convenient or effective. It takes about an hour to remove the liquid from a typical septic tank in this way, which then requires the operator or helper to hold the flashlight or torch for an hour. Ideally, the light should be mounted onto the hose or onto the intake nozzle, but no practical arrangement to accomplish this has existed previously.

This process can be complicated if blockages occur within the septic tank, which normally requires the operator to clean them away using a jetter hose to direct a high pressure spray at the solid material. This is difficult and time consuming if the operator is required by himself both to suck out the liquid from the septic tank and also operate the jetter hose.

In the embodiment shown here a clamp ring 12 has two main components that are fastened together onto the suction hose 10 or onto the generally cylindrical intake nozzle, and here is shown carrying a number tools 14 of generally cylindrical shape, i.e., in this case four (4) flashlights oriented so their beams are directed in the distal direction and parallel with the axis of the tubular suction hose and intake nozzle.

The clamp ring has two half ring components 16, which favorably are of identical shape, and positioned so as to connect the ends of each to corresponding ends of the other.

As shown favorably in FIGS. 3A to 3D, each half-ring 16 has an inside semi-cylindrical surface 18 that is positioned against the surface of the hose 10 (or nozzle), and there are a pair of generally cylindrical tool sockets 20 that penetrate through in an axial direction, each socket 20 having a diameter of a nominal 1¼ inches so as to match the size of the flashlight or other tool to be held there. Connected to each socket 20 there is an associated slot 22, also open through in the axial direction, so as to define a tongue 24 between the outside of the half ring and the slot 22. The tongue is free at the end remote from the socket 20. A respective bolt hole 26 extends in a radial direction through the tongue 24 and then across the slot into a remaining arcuate band 28 at the radial inward part of the half ring 16. The part of the bolt hole 16 in the band 28 may be threaded so that a suitable threaded bolt can be used to draw the tongue 24 radially inward and squeeze the respective socket 20 against the flashlight or other tool being held in the socket.

Each end of the half-ring 16 is a flat end surface 30 oriented to face a corresponding end surface 30 of the other half-ring 16. Favorably, at one end or at both ends there can be an access cut-out 32 of arcuate profile and ending above the end surface to define a flat flange 34, with a bolt hole centered in the flange 32. If the access cut out 32 and flange 34 are formed on both sides, the two half-rings 16 can be joined by a pair of bolts 40 with the head of the bolt fitting into one or the other cut out 32 and with a nut (not shown) in the cut out 32 on the opposite half-ring 16. Where the access cut out 32 and flat flange 34 are provided at one end only of the two half-rings 16, threaded bores can be provided on the other side or each half-ring to receive the threaded shafts of the bolts 40.

Meanwhile, bolts or similar threaded fasteners 36 are provided for the bolt holes or bores 26 that can be tightened to draw in the corresponding tongues 24 for tightening the cylindrical tool sockets against the corresponding flashlight or similarly shaped tool.

A second embodiment, here shown with a somewhat configuration of the two ring-halves of the clamp, is illustrated in FIGS. 4A to 4D, where the same or similar elements are identified with similar reference numbers as in the first embodiment, but raised by “100”, and thus need not be described in detail again. In this second embodiment (FIGS. 3A to 3D) there are recesses along the sides that relieve some of the material and weight, and there are open flanges 134 without maintaining the curved contour at the two ends of each of the half rings 116.

The sockets 120 have a preferred diameter of a nominal 1¼ inches, but this is not critical and the dimensions can be larger or smaller depending on the desired application. The sockets 120 and associated slots 122 result in a resilient tongue 124 that can be pulled in, i.e., bolted down to snug the respective socket against a tool fitted into it.

Rather the bolts or similar threaded fasteners as shown, these clamp holders can employ other elements to attach the two half-rings 16, 16 or 116, 116, and to pull in the tongues 24, 124 to assist in gripping the flashlight or similar tool.

These illustrated embodiments have four (4) sockets 20 or 120, spaced at about ninety degrees of arc from one another, that is each half-ring having two sockets spaced apart by ninety degrees of arc. However, there can be more or fewer sockets provided, and they need not be all the same size nor all have the same angular separation. Also it is possible to employ a clamp holder in which there are tool sockets only on one of the half-rings, and in some cases to employ a clamp holder formed of three or more arcuate components instead of the two half-rings.

Figure 5:
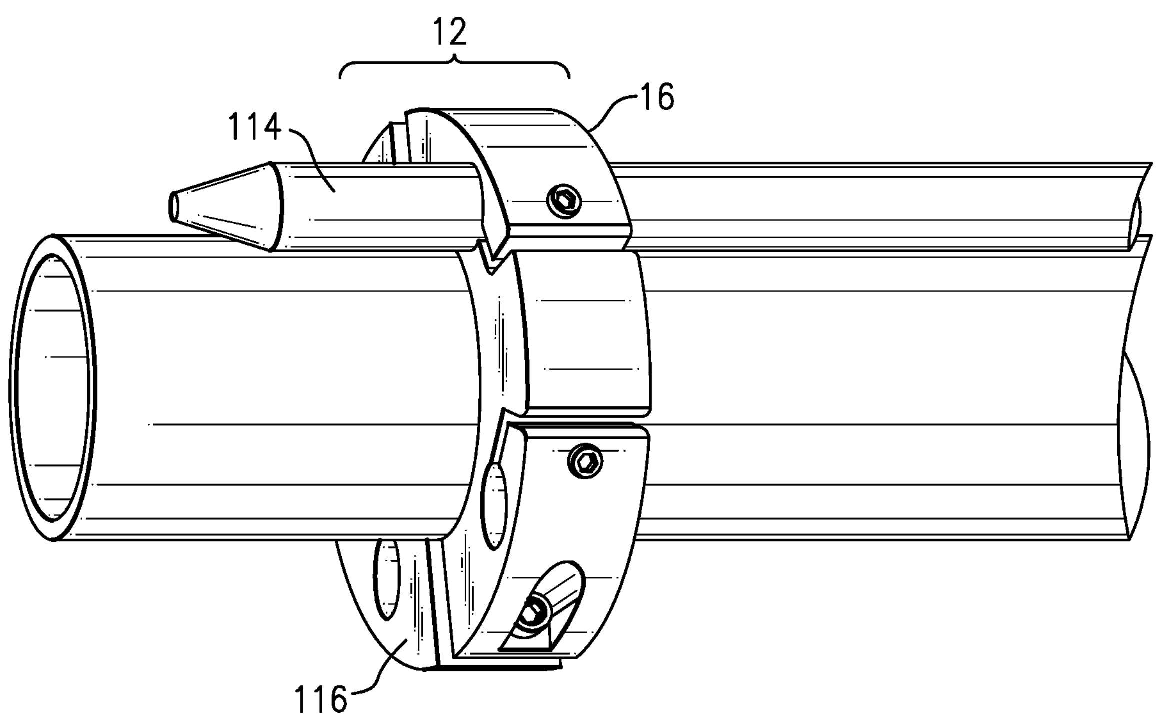
FIG. 5 is a perspective view showing a clamp holder of this invention with a fetter hose.

FIG. 5 is a perspective of an implementation in which the annular clamp holder 12 is employed to attach a jetter hose 114 onto a suction hose. This can assist in removing or breaking up accumulations of solids and also in thinning denser material that may accumulate at the bottom of the septic tank. The jetter hose 114 is dimensioned to fit snugly into one of the cylindrical sockets 20 and is oriented parallel to the axis of the hose 10 and pointed in the distal direction (here, to the left). A flashlight or other tool can be mounted in one or another of the remaining sockets.

While the illustrated embodiment is adapted for use with a pumper truck, a clamp holder of this construction could find other applications where material is to be picked up and moved through a vacuum hose or suction hose, or on other cylindrical members.

While the invention has been described in terms of a preferred embodiment, many additional variations thereof are possible and would present themselves to persons of skill in the art without departing from the scope and spirit of this invention.

What is claimed is:

1. A hose clamp holder for mounting one or more generally tubular objects onto a hose of a generally cylindrical section and having a predetermined diameter, the hose clamp holder comprising a pair of generally C-shaped members, each such member having a half-round inner curved surface having generally said predetermined diameter;

each said C-shaped member having a pair of end portions adapted to receive a fastener to join the end portion with a corresponding end portion of the other C-shaped member;

each said member having one or more round apertures that each extend axially through the respective C-shaped member, each said round aperture being adapted to hold as said tubular object an auxiliary tool; and said C-shaped members each having a slot extending from said aperture circumferentially to exit said C-shaped member, and extending axially therethrough, and a fastener associated with said one or more round apertures, configured to squeeze the aperture against said auxiliary tool.

2. The hose clamp holder according to claim 1 wherein each said C-shaped member has a pair of said round apertures spaced apart substantially ninety degrees of arc.

3. The hose clamp holder according to claim 1, wherein each said C-shaped member has a radial shoulder formed at each end thereof with a bore configured for accepting a fastener passing therethrough and through the bore of the corresponding shoulder of a mating C-shaped member.

4. The hose clamp holder according to claim 1 wherein the predetermined radius of said half-round inner surface is in the range of substantially 1½ to 2 inches.

5. The hose clamp holder according to claim 4 wherein said C-shaped member has an axial thickness of substantially 1 inch to 1½ inches.

6. The hose clamp holder according to claim 4 wherein said C-shaped member has a radial thickness of substantially 1½ inches to 2 inches.

7. The hose clamp holder according to claim 1 wherein said one or more round apertures have a diameter of substantially 1¼ inches.

8. A hose clamp holder for mounting one or more generally tubular objects onto a hose of a generally cylindrical section and having a predetermined diameter, the hose clamp holder comprising a pair of generally C-shaped members, each such member having a half-round inner curved surface having generally said predetermined diameter;

each said member having one or more round apertures that each extend axially through the respective C-shaped member;

each said C-shaped member having a pair of end portions adapted to receive a fastener to join the end portion with a corresponding end portion of the other C-shaped member; and wherein each said round aperture has an associated cut-out extending generally in a circumferential direction from said round aperture and defining a tongue at a radially outer portion of the C-shaped member, said tongue having a free end spaced from said round aperture.

9. The hose clamp holder according to claim 8 with said C-shaped member having an arcuate portion disposed along each said cut-out opposite the associated tongue and radially inward thereof on said C-shaped member, each said tongue having a bore extending radially therethrough and having a portion extending into the associated one of said arcuate portions.

10. The hose clamp holder according to claim 9 wherein said portion of each said bore extending into said arcuate portion is threaded to accept a threaded fastener member.

11. The hose clamp holder according to claim 8 wherein each said C-shaped member is formed of a synthetic resin such that each said tongue is adapted to be deflected radially for clamping one of said tubular objects within the associated round aperture.

12. In combination, a hose clamp holder for mounting one or more generally tubular objects onto a hose of a generally cylindrical section and having a predetermined diameter, wherein the hose clamp holder comprises a pair of generally C-shaped halves, each half having a half-round inner curved surface having generally said predetermined diameter; with each said half having one or more round apertures that each extend axially through the respective C-shaped half, and with each said C-shaped half having a pair of end portions adapted to receive a fastener to join the end portion with a corresponding end portion of the other C-shaped half, wherein each said one or more round apertures has an associated slot extending therefrom generally circumferentially to exit said C-shaped half, and extending axially therethrough; and at least one tubular member being fitted into one of said one or more round apertures and directed in an axial direction aligned with said hose of generally cylindrical section; wherein said C-shaped halves each further comprise a fastener associated with the slot of said one or more round apertures, configured to squeeze the aperture against said at least one tubular member.

13. The combination according to claim 12 wherein said tubular member comprises a lamp having a casing that is generally cylindrical and of a diameter to fit snugly into said one of said one or more apertures.

14. The combination according to claim 12 wherein said tubular member comprises a jet spray tool for configured for spraying a jet of water in said axial direction and having a nozzle portion of a diameter to fit snugly into said one of said one or more apertures.

* * * * *